United States Patent
Kozuma et al.

(10) Patent No.: US 10,584,744 B2
(45) Date of Patent: Mar. 10, 2020

(54) REFRIGERANT COMPRESSOR WITH SUPPORTING BEARING INSULATION

(71) Applicant: Hitachi-Johnson Controls Air Conditioning, Inc., Tokyo (JP)

(72) Inventors: Yuko Kozuma, Tokyo (JP); Yasuaki Iizuka, Tokyo (JP); Mutsunori Matsunaga, Tokyo (JP); Masaru Ohtahara, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 308 days.

(21) Appl. No.: 15/624,772

(22) Filed: Jun. 16, 2017

(65) Prior Publication Data

US 2018/0066700 A1 Mar. 8, 2018

(30) Foreign Application Priority Data

Sep. 5, 2016 (JP) .................................. 2016-172795

(51) Int. Cl.
*F04C 18/02* (2006.01)
*F04C 27/00* (2006.01)
(Continued)

(52) U.S. Cl.
CPC .......... *F16C 19/52* (2013.01); *F04C 18/0215* (2013.01); *F04C 27/008* (2013.01);
(Continued)

(58) Field of Classification Search
CPC .. F04C 27/008; F04C 29/0057; F04C 29/023; F04C 18/0215; H02K 5/173; F01C 21/02; F25B 31/002
(Continued)

(56) References Cited

U.S. PATENT DOCUMENTS

| 2008/0304994 A1* | 12/2008 | Ohtahara | ............ F04C 18/0215 |
| | | | 418/55.1 |
| 2013/0319728 A1* | 12/2013 | Musinana | .............. H02K 5/173 |
| | | | 174/138 R |

FOREIGN PATENT DOCUMENTS

| CN | 102966673 A | 3/2013 |
| JP | 2011-259646 A | 12/2011 |
| WO | 2013/145018 A1 | 10/2013 |

OTHER PUBLICATIONS

Extended European Search Report received in corresponding European Application No. 17178459.8 dated Jan. 22, 2018.

* cited by examiner

*Primary Examiner* — Deming Wan
(74) *Attorney, Agent, or Firm* — Mattingly & Malur, PC

(57) ABSTRACT

A refrigerant compressor includes a compression mechanism portion, a drive portion, a crankshaft, a main bearing and an auxiliary bearing that support the crankshaft, and a sealed container that accommodates therein the compression mechanism portion, the drive portion, the crankshaft, the main bearing, and the auxiliary bearing. The auxiliary bearing is configured of an antifriction bearing and provided in an auxiliary bearing housing attached to the sealed container. The auxiliary bearing housing includes an opening for inserting the auxiliary bearing on the drive portion side, and includes a housing cover covering the opening. An insulating sleeve configured of an insulating material is provided between the crankshaft and the auxiliary bearing. The insulating sleeve includes a cylinder portion located between the crankshaft and the auxiliary bearing, and a flange portion located between the auxiliary bearing and the housing cover and extended in an outer diameter direction.

5 Claims, 3 Drawing Sheets

(51) Int. Cl.
 *F04C 29/00* (2006.01)
 *F04C 29/02* (2006.01)
 *F25B 31/00* (2006.01)
 *H02K 5/173* (2006.01)
 *F01C 21/02* (2006.01)
 *F16C 19/52* (2006.01)
 *F25B 31/02* (2006.01)
 *F04C 23/00* (2006.01)

(52) U.S. Cl.
 CPC ........ *F04C 29/0057* (2013.01); *F04C 29/023* (2013.01); *F25B 31/002* (2013.01); *F25B 31/026* (2013.01); *F04C 23/008* (2013.01); *F04C 2240/50* (2013.01); *F04C 2280/04* (2013.01)

(58) Field of Classification Search
 USPC .............................................. 418/55.1–55.5
 See application file for complete search history.

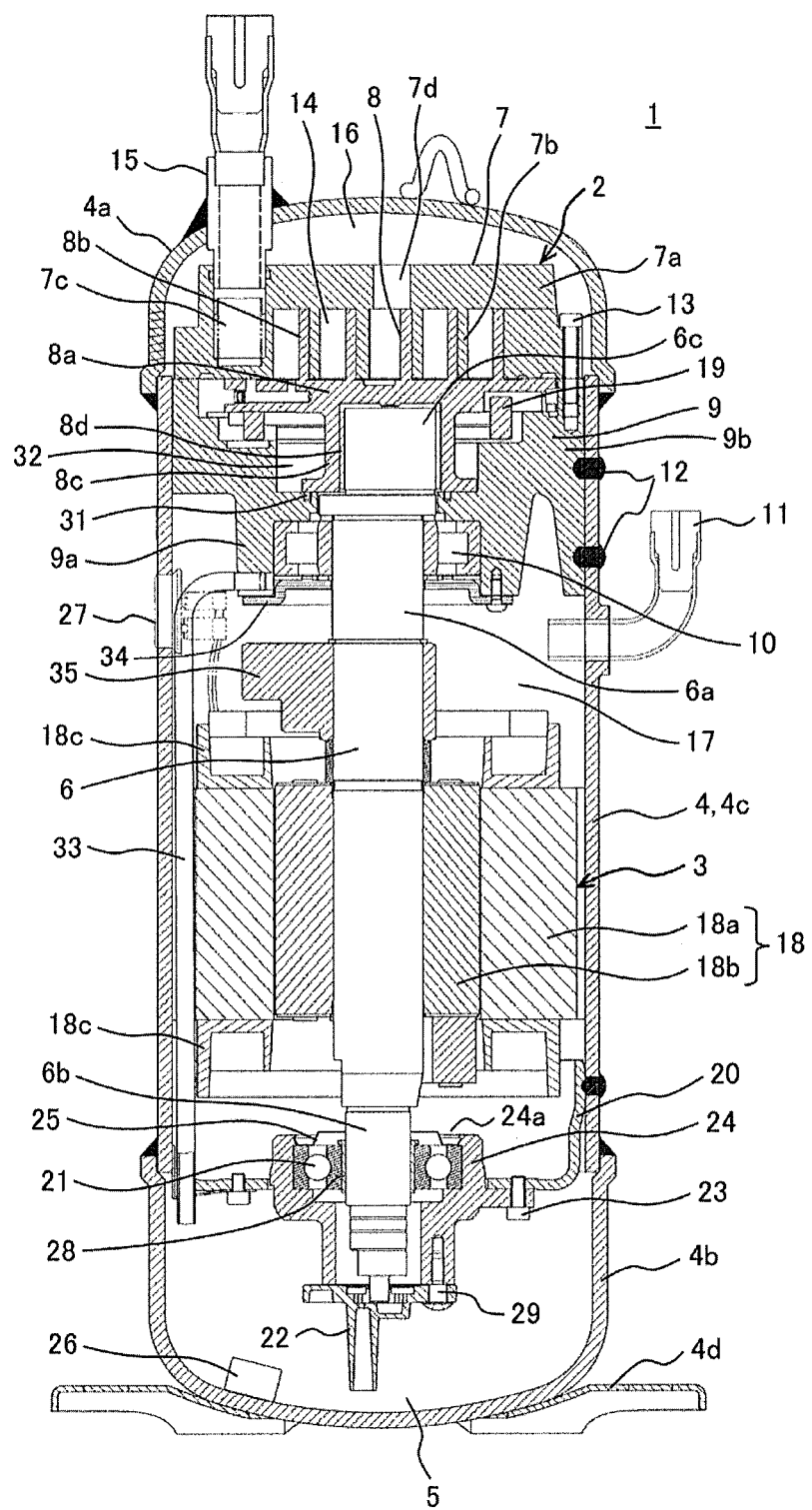
[FIG. 1]

[FIG. 2]
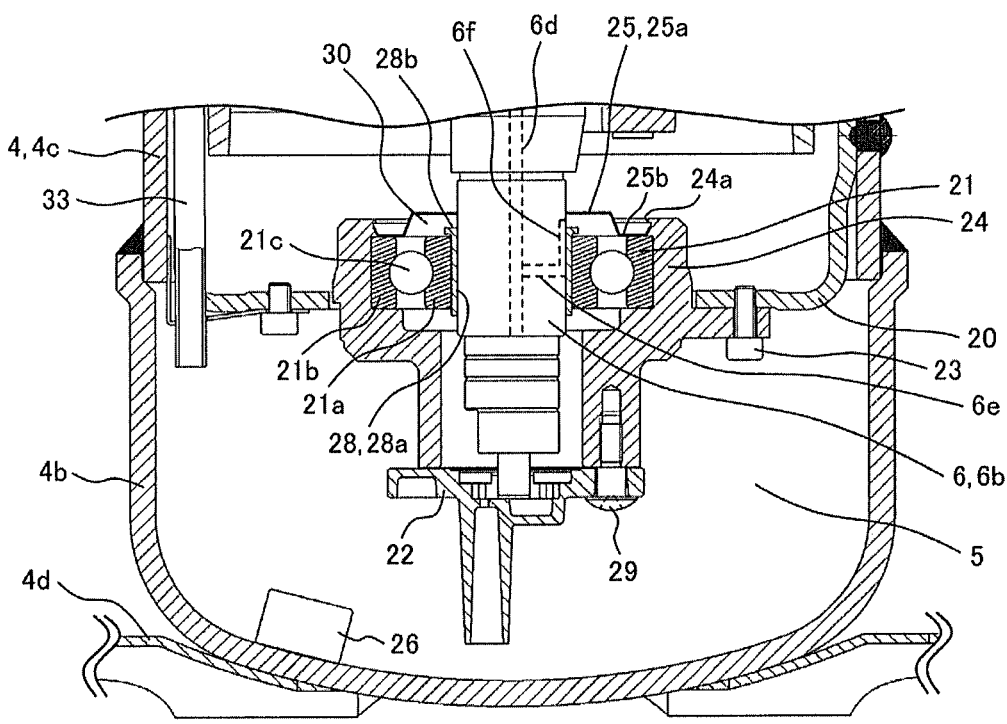

[FIG. 3]
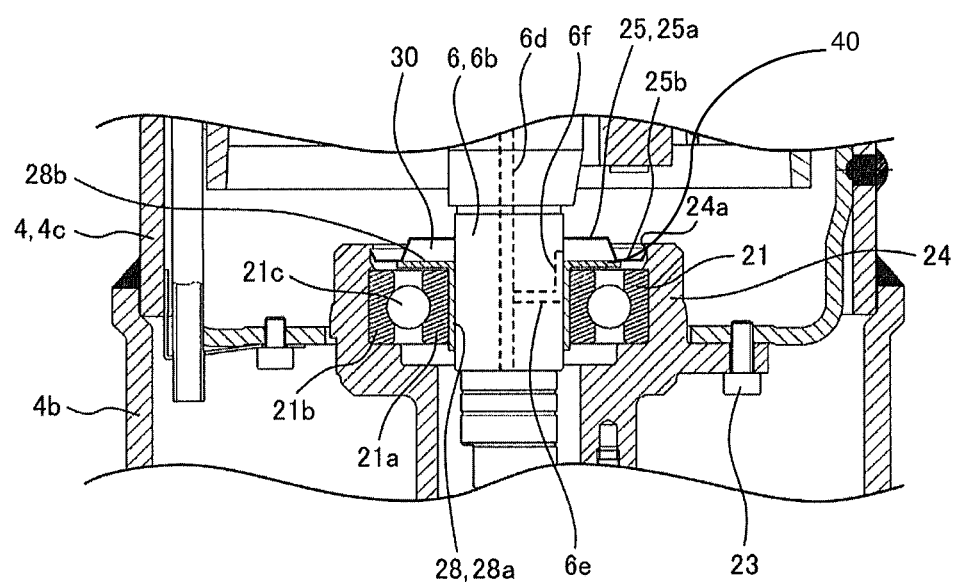

REFRIGERANT COMPRESSOR WITH SUPPORTING BEARING INSULATION

TECHNICAL FIELD

The present invention relates to a refrigerant compressor, which is particularly suitable as a positive-displacement refrigerant compressor that is used in refrigeration cycle equipment such as air-conditioning equipment and compresses an HFC-based refrigerant or a natural refrigerant such as air or carbon dioxide.

BACKGROUND ART

Positive-displacement refrigerant compressors are widely used in various fields as compressors for refrigeration and air-conditioning equipment. The positive-displacement refrigerant compressor is required to be of high efficiency for global warming prevention, so that variable speed operation in which an inverter is used to drive an electric motor is increased and thus efficiency is enhanced, compared to a conventional constant-speed type refrigerant compressor.

In the refrigerant compressor using an inverter, a drive current (an input current from the inverter to the motor) at a high load is much increased, compared to the conventional constant-speed type refrigerant compressor. For this reason, a voltage (shaft voltage) generated at a crankshaft that rotates integrally with the electric motor tends to increase. With this increase in shaft voltage, a potential difference present between the inner race and outer race of an antifriction bearing that supports the crankshaft is increased, giving rise to an increase in the current flowing through the antifriction bearing.

This current causes corrosion, called electrolytic corrosion, on rolling surfaces between both raceways of the inner race and outer race of the antifriction bearing and rolling elements, decreasing the reliability of the refrigerant compressor.

Examples of a conventional positive-displacement refrigerant compressor configured to prevent such electrolytic corrosion include one disclosed in JP-A-2011-259646 (PTL 1).

In PTL 1, in a positive-displacement refrigerant compressor, a plurality of neutral points in an electric motor provided with Y-connected three-phase windings having the neutral points are connected to each other, whereby a current itself flowing through a bearing portion is reduced to reduce bearing damage due to bearing electrolytic corrosion and thus prevent a reduction in bearing reliability.

Moreover, PTL 1 discloses that an insulating member is provided on the surface of a crankshaft engaging with an auxiliary bearing that supports an auxiliary shaft portion of the crankshaft, to block a current passing through the auxiliary bearing and thereby reduce bearing damage due to bearing electrolytic corrosion.

CITATION LIST

Patent Literature

[PTL 1] JP-A-2011-259646

SUMMARY OF INVENTION

Technical Problem

In recent years, there has been a growing interest in energy reduction, so that an improvement in efficiency is required in various industries. Particularly in air-conditioning equipment close to living environment, it is required to develop a product with high reliability capable of achieving lower cost and higher efficiency because of a great deal of attention of public opinion.

Product development using inverter driving is the mainstream of refrigerant compressors. However, since the drive current at a high load is increased more than that during rated operation as described above, inverter driving gives rise to an increase in the current flowing through the bearing portion via the crankshaft, that is, in the shaft current.

For this reason, it is required to use an antifriction bearing provided with measures against electrolytic corrosion. Examples of the antifriction bearing provided with measures against electrolytic corrosion include an antifriction bearing filled with a conductive grease and an antifriction bearing using ceramics for rolling elements.

However, since an antifriction bearing is used in a liquid refrigerant obtained by mixing a refrigeration oil and a refrigerant in a refrigerant compressor, the antifriction bearing filled with a conductive grease has a problem in that the grease leaks out. Moreover, although the antifriction bearing using ceramics for rolling elements can be used in a refrigerant compressor, the antifriction bearing has a problem in that the cost price of the refrigerant compressor becomes high because the antifriction bearing is expensive.

Moreover, PTL 1 discloses that the insulating member is provided on the surface of the crankshaft engaging with the auxiliary bearing to thereby block the current passing through the auxiliary bearing and reduce the bearing damage due to bearing electrolytic corrosion.

However, the refrigerant compressor in PTL 1 has a risk that the insulating member may come off during the long-term operation of the refrigerant compressor, and has a problem in that the coming-off of the insulating member causes bearing electrolytic corrosion and leads to bearing damage. Moreover, there is also a problem in that when an antifriction bearing is used as an auxiliary bearing, the oil supplied to the auxiliary bearing splashes, due to the rotation of the crankshaft, from the portion of the auxiliary bearing in a sealed container and is discharged to the outside of the compressor together with the refrigerant, and thus the supply amount of oil to each sliding portion of the compressor becomes insufficient. In the refrigerant compressor in PTL 1, consideration is not given to these problems. Hence, there is a problem in that the reliability of the compressor is reduced.

It is an object of the invention to obtain a refrigerant compressor capable of achieving an improvement in reliability by suppressing bearing damage due to bearing electrolytic corrosion or an insufficient supply amount of oil without using an antifriction bearing filled with a conductive grease but with an inexpensive structure.

Solution to Problem

To achieve the above object, the invention is directed to a refrigerant compressor including: a compression mechanism portion that compresses a refrigerant; a drive portion for driving the compression mechanism portion; a crankshaft that is rotationally driven by the drive portion; a main bearing that rotationally supports a main shaft portion of the crankshaft on the compression mechanism portion side of the drive portion; an auxiliary bearing that rotationally supports an auxiliary shaft portion of the crankshaft on the side of the drive portion opposite to the compression mechanism portion; and a sealed container that accommodates therein the compression mechanism portion, the drive portion, the crankshaft, the main bearing, and the auxiliary bearing, wherein the auxiliary bearing is configured of an antifriction bearing including an inner race, an outer race, and a rolling element, and is provided in an auxiliary bearing housing attached to the sealed container, the auxiliary bearing housing includes an opening for inserting the auxiliary bearing on the drive portion side, and includes a housing cover covering the opening, an insulating sleeve configured of an insulating material is provided between the crankshaft and the auxiliary bearing, and the insulating sleeve includes a cylinder portion located between the crankshaft and the auxiliary bearing, and a flange portion located between the auxiliary bearing and the housing cover and extended in an outer diameter direction.

Advantageous Effects of Invention

According to the invention, there is an advantageous effect that it is possible to obtain a refrigerant compressor capable of achieving an improvement in reliability by suppressing bearing damage due to bearing electrolytic corrosion or an insufficient supply amount of oil without using an antifriction bearing filled with a conductive grease but with an inexpensive structure.

BRIEF DESCRIPTION OF DRAWINGS

FIG. 1 is a longitudinal cross-sectional view showing Embodiment 1 of a refrigerant compressor of the invention.

FIG. 2 is an enlarged cross-sectional view showing, in an enlarged manner, the vicinity of an auxiliary bearing of the refrigerant compressor shown in FIG. 1.

FIG. 3 is a diagram showing Embodiment 2 of a refrigerant compressor of the invention, which is an enlarged cross-sectional view of a main portion corresponding the vicinity of the auxiliary bearing of the refrigerant compressor shown in FIG. 1.

DESCRIPTION OF EMBODIMENTS

Hereinafter, specific embodiments of the invention will be described based on the drawings. In the drawings, portions denoted by the same reference sign show the same or equivalent portions.

Embodiment 1

Embodiment 1 of a refrigerant compressor of the invention will be described using FIGS. 1 and 2. FIG. 1 is a longitudinal cross-sectional view of the refrigerant compressor of Embodiment 1, and FIG. 2 is an enlarged cross-sectional view showing, in an enlarged manner, the vicinity of an auxiliary bearing of the refrigerant compressor shown in FIG. 1.

First, the overall structure of the refrigerant compressor of Embodiment 1 will be described using FIG. 1.

In Embodiment 1, the case where the invention is applied to a positive-displacement scroll compressor 1 will be described as a refrigerant compressor; however, the refrigerant compressor of the invention is not limited to a scroll compressor but can also be applied similarly to positive-displacement compressors of other compression types such as a rotary type, a reciprocating type, or a screw type.

The scroll compressor 1 in the embodiment is of a vertical type, and is configuredby accommodating a compression mechanism portion 2 and a drive portion 3 that drives the compression mechanism portion 2 in a sealed container 4.

The sealed container 4 is cylindrically configured. In the sealed container 4, the compression mechanism portion 2, the drive portion 3, and an oil reservoir 5 are arranged in this order from above. The compression mechanism portion 2 is coupled to the drive portion 3 via a crankshaft 6. Reference sign 35 indicates a balance weight attached to the crankshaft 6.

The compression mechanism portion 2 is configured of, as basic elements, a fixed scroll 7, an orbiting scroll 8 facing the fixed scroll 7 and meshed therewith, and a frame 9 that fixes the fixed scroll 7.

The frame 9 is fixed to the sealed container 4 and includes a bearing support portion 9a for placing a main bearing 10 configured of an antifriction bearing (roller bearing), and a support portion 9b extending from the upper portion of the bearing support portion 9a in the outer diameter direction and fixing the fixed scroll 7. The lower surface of the support portion 9b is formed flat and which disposed higher than a discharge pipe 11 provided so as to penetrate the sealed container 4. The outer circumferential surface of the support portion 9b is fixed to the inner circumferential surface of the sealed container 4 at multiple locations in the circumferential direction by welds 12. Reference sign 34 indicates a frame cover for covering the lower end surface of the frame 9 and holding the main bearing 10.

The fixed scroll 7 includes a base plate 7a and a scroll wrap 7b perpendicularly erected on the lower side of the base plate 7a. A suction port 7c is provided in the outer circumferential portion of the base plate 7a, and a discharge port 7d is provided in the center of the base plate. The fixed scroll 7 is fixed to the frame 9 by means of a plurality of volts 13. The plurality of volts 13 are equally disposed in the circumferential direction.

The orbiting scroll 8 includes a base plate 8a and a scroll wrap 8b perpendicularly erected on the upper side of the base plate 8a. An orbiting boss portion 8c is provided so as to perpendicularly project in the center of the base plate 8a on the side opposite to the scroll wrap. An orbiting bearing 8d configured of a sliding bearing is provided by press fitting in the orbiting boss portion 8c.

The fixed scroll 7 and the orbiting scroll 8 are meshed with each other to thereby form a compression chamber 14, and the orbiting scroll 8 performs orbiting movement to thereby perform compressing operation by which the volume decreases. That is, a suction pipe 15 is provided so as to penetrate an upper cap 4a of the sealed container 4 and be connected to the suction port 7c. With the orbiting movement of the orbiting scroll 8, a refrigerant gas in a refrigeration cycle (not shown) is sucked into the compression chamber 14 via the suction pipe 15 and the suction port 7c.

The refrigerant gas sucked into the compression chamber 14 is subjected to a compression stroke, discharged through the discharge port 7d of the fixed scroll 7 to a discharge chamber 16 in the upper portion of the interior of the sealed container 4, and thereafter flows through a communication path (not shown) formed in the outer circumferential surface of the frame 9 to an electric motor chamber 17 side where the drive portion 3 is provided. The compressed refrigerant gas flowing to the electric motor chamber 17 side flows through the discharge pipe 11 to the refrigeration cycle. With this configuration, the space in the sealed container 4 is maintained at a discharge pressure. As the refrigerant gas compressed by the compression mechanism portion 2, a refrigerant such as R410A or R32 having a low warming potential with consideration for the global environment is used.

Reference sign 31 indicates a seal ring provided in a groove on the upper surface of the frame 9 facing the lower end surface of the orbiting boss portion 8c. The seal ring 31 restrains a refrigerant gas or oil in a discharge pressure state from flowing into a back pressure chamber 32 formed at the back side of the orbiting scroll 8. Hence, the back pressure chamber 32 has an intermediate pressure between the discharge pressure and the suction pressure, and the orbiting scroll 8 is pressed against the fixed scroll 7 by the resultant of forces of the intermediate pressure in the back pressure chamber 32 and the discharge pressure acting on the inside of the seal ring 31.

The drive portion 3 for causing the orbiting scroll 8 to perform orbiting movement is configured of an electric motor 18 including a stator 18a and a rotor 18b, the crankshaft 6 rotating integrally with the rotor 18b, an Oldham coupling 19 for preventing the rotation of the orbiting scroll 8, and the like. Reference sign 18c indicates a coil end portion of the stator 18a of the electric motor 18.

The crankshaft 6 is configured of a main shaft portion 6a rotationally supported by the main bearing 10 provided in a bearing support portion 9a of the frame 9, an auxiliary shaft portion 6b provided below the electric motor 18 and rotationally supported by an auxiliary bearing 21 attached via an auxiliary frame 20 to the sealed container 4, an eccentric pin portion 6c provided on the upper end side of the main shaft portion 6a and inserted into and engaged with the orbiting bearing 8d of the orbiting scroll 8, and the like. The main shaft portion 6a and the auxiliary shaft portion 6b are formed coaxially, and the eccentric pin portion 6c is provided eccentrically relative to the main shaft portion 6a. The eccentric pin portion 6c is engaged freely rotatably and movably in the axial direction with the orbiting bearing 8d of the orbiting scroll 8.

An oil supply pump 22 is provided by press fitting at the lower end portion of the crankshaft 6. An oil passage 6d (see FIG. 2) formed so as to penetrate the crankshaft 6 in the axial direction is provided. An oil (refrigeration oil) in the oil reservoir 5 in the lower portion of the sealed container 4 is supplied to the oil passage 6d via the oil supply pump 22. An oil supply hole 6e (see FIG. 2) branching off from the oil passage 6d in the radial direction for supplying the oil to the auxiliary bearing 21 is provided in the auxiliary shaft portion 6b.

The orbiting bearing 8d is lubricated with the oil supplied from the oil supply pump 22 via the oil passage 6d into the orbiting boss portion 8c at the end of the eccentric pin portion 6c. Thereafter, a part of the oil passes over the seal ring 31 via oil holes, oil grooves (not shown), and the like formed in the lower end surface of the orbiting boss portion 8c, and is supplied to the back pressure chamber 32. The remaining oil is returned, after the lubrication of the main bearing 10, to the oil reservoir 5 via an oil drain pipe 33.

The main bearing 10 is configured of a roller bearing as an antifriction bearing, and arranged on the upper side of the electric motor 18 at the crankshaft 6. On the other hand, the auxiliary bearing 21 is configured of a ball bearing as an antifriction bearing, and arranged on the lower side of the electric motor 18. The main bearing 10 and the auxiliary bearing 21 rotationally support the crankshaft 6.

The auxiliary bearing 21 is provided in an auxiliary bearing housing 24 attached with a volt 23 to the auxiliary frame 20 fixed to the sealed container 4 by a weld. Specifically, the auxiliary bearing housing includes an opening 24a for inserting the auxiliary bearing 21 on the drive portion 3 side, the auxiliary bearing 21 is inserted from above through the opening 24a, and further, a housing cover 25 covering the opening 24a above the auxiliary bearing 21 is provided.

The housing cover 25 is for preventing the oil supplied to the auxiliary bearing 21 from splashing to the drive portion 3 side, and is configured so as to cover a portion from the outer circumferential side of the crankshaft 6 to the portion of the outer race of the auxiliary bearing (ball bearing) 21.

The sealed container 4 includes the upper cap 4a and a lower cap 4b. The upper cap 4a and the lower cap 4b are fitted to a central cylindrical portion 4c of the sealed container 4 so as to cover the outside thereof, and the fit end portions are welded by heating from obliquely below and obliquely above by a welding torch. A leg portion 4d is attached to the bottom surface of the sealed container 4. Reference sign 26 indicates a magnet attached to the inside of the lower cap 4b, and the magnet 26 performs the duty of collecting dust in the compressor.

A hermetic terminal 27 is provided in the side surface of the sealed container 4, so that power can be supplied to the electric motor 18. The hermetic terminal 27 is provided to penetrate the sealed container 4, and is located between the coil end 18c on the upper side in the stator 18a and the frame 9.

Next, configurations in the vicinity of the auxiliary bearing 21 shown in FIG. 1 will be described in detail using FIG. 2.

In the embodiment, an insulating sleeve 28 configured of an insulative resin (insulating material) is provided between the auxiliary bearing 21 and the crankshaft 6. As the material of the insulative resin used for the insulative sleeve 28, polytetrafluoroethylene (PTFE), polyacetal (POM), polybutyleneterephthalate (PBT), polyphenylenesulfide (PPS), polyether ether ketone (PEEK), or the like can be used.

In the embodiment as described above, by arranging the insulating sleeve 28 configured of the resin material having an insulating property between the auxiliary bearing 21 and the crankshaft 6, it is possible to block a shaft current, which is generated by inverter-driving the electric motor 18, from flowing via the crankshaft 6 into the auxiliary bearing 21 configured of an antifriction bearing. Hence, it is possible to prevent or suppress the occurrence of electrolytic corrosion in the auxiliary bearing 21.

The assembly is as follow.

First, the insulating sleeve 28 is fitted by means of press fitting or the like on the inner diameter side of an inner race 21a of the ball bearing (antifriction bearing) as the auxiliary bearing 21, and thereafter, the auxiliary bearing 21 is inserted from above by means of press fitting or the like into the auxiliary bearing housing 24. Next, the housing cover 25 described above is fitted into the opening 24a of the auxiliary bearing housing 24 and fixed thereto so as to cover the opening 24a above the auxiliary bearing 21. In this state, after the auxiliary bearing 21 is inserted into the auxiliary shaft portion 6b of the crankshaft 6 together with the auxiliary bearing housing 24, the auxiliary bearing housing 24 is attached and fixed to the auxiliary frame 20 with the volt 23. The fit between the inner race 21a of the auxiliary bearing 21 and the auxiliary shaft portion 6b is set to transition fit or interference fit to the extent of light press-fitting.

The oil supply pump 22 is coupled with the lower end portion of the crankshaft 6 and fixed to the auxiliary bearing housing 24 with a screw 29 or the like.

The crankshaft 6 is provided with the oil passage 6d formed to penetrate the crankshaft 6 in the axial direction and the oil supply hole 6e branching off from the oil passage 6d and formed in the radial direction. Therefore, when the crankshaft 6 rotates to drive the oil supply pump 22, the oil supply pump 22 sucks the oil from the oil reservoir 5 and the oil is supplied to the insulating sleeve 28 via the oil passage 6d and the oil supply hole 6e.

An axial groove 6f is formed on the surface of the auxiliary shaft portion 6b at a portion where the insulating sleeve 28 is disposed, and is configured such that the oil supplied through the oil supply hole 6e to the back side of the insulating sleeve 28 passes through the axial groove 6f to flow to the housing cover 25 side, is introduced between the auxiliary bearing 21 and the housing cover 25, and thereafter supplied to the auxiliary bearing 21.

The housing cover 25 is configured such that, in an inner portion 25a located on the inner race 21a side of the auxiliary bearing 21, a flow passage 30 is formed by forming a large clearance between the inner race 21a and the housing cover 25 so as to allow the oil to pass therethrough, and that, in an outer portion 25b located on an outer race 21b side of the auxiliary bearing 21, the housing cover 25 is in contact with the outer race 21b. Hence, after the oil supplied via the oil supply hole 6e and the axial groove 6f is supplied to rolling elements 21c of the ball bearing (antifriction bearing) as the auxiliary bearing 21 via the flow passage 30 formed between the housing cover 25 and the inner race, the oil is discharged to the oil reservoir 5 side on the lower side.

In the embodiment, the insulating sleeve 28 includes a cylinder portion 28a located between the crankshaft 6 and the auxiliary bearing 21, and a flange portion 28b located between the auxiliary bearing 21 and the housing cover 25 and extended in the outer diameter direction. In the example shown in FIG. 2, the position of the edge of the flange portion 28b in the outer diameter direction is extended closer to the outer diameter side than the inner diameter of the inner race 21a of the ball bearing as the auxiliary bearing 21, and is formed to have a diameter smaller than the outer diameter of the inner race 21a.

Since the clearance between the upper end of the flange portion 28b and the housing cover 25 is configured to be smaller than the axial width of the cylinder portion 28a, the insulating sleeve 28 does not come off upward. Further, with the provision of the flange portion 28b, the insulating sleeve 28 can be prevented from coming off downward. Moreover, since the flange portion 28b is provided only on the upper end side (the housing cover 25 side) but not provided on the lower end side in the embodiment, detachment of the insulating sleeve 28 relative to the inner race 21a of the auxiliary bearing 21 can be easily performed.

As has been described above, according to the refrigerant compressor of Embodiment 1, since the insulating sleeve 28 is arranged between the auxiliary bearing 21 and the crankshaft 6, it is possible to block the shaft current from flowing into the auxiliary bearing 21 via the crankshaft 6. Hence, it is possible to suppress bearing damage due to electrolytic corrosion occurring in the auxiliary bearing 21 configured of a ball bearing (antifriction bearing). In an antifriction bearing, particularly in a ball bearing, the rolling element 21c is in point contact with the inner race 21a and the outer race 21b. Therefore, an electric discharge is likely to occur when the shaft current flows between the inner race 21a and the outer race 21b, and thus particularly electrolytic corrosion is likely to occur. Thus, it is effective to apply the invention to the auxiliary bearing 21 configured of a ball bearing.

When a roller bearing is used as an antifriction bearing, an electric discharge is less likely to occur than in the case of a ball bearing because the rolling element 21c is in line contact with the inner race 21a and the outer race 21b. However, even in the case of using the roller bearing, an advantageous effect that the occurrence of electrolytic corrosion can be suppressed is obtained.

Moreover, since the housing cover 25 is provided, it is possible to prevent the splashing of the oil supplied to the auxiliary bearing 21 via the oil supply hole 6e formed in the crankshaft 6. A refrigerant compressor requires continuous oil supply to each sliding portion. However, when an antifriction bearing is used for the auxiliary bearing 21, the oil supplied to the auxiliary bearing splashes in the sealed container 4 and is discharged together with a refrigerant to the outside of the compressor. Thus, the refrigerant compressor has a problem in that a proper amount of oil cannot be supplied to each sliding portion of the compressor. In contrast to this, since the housing cover 25 is provided in the embodiment, the splashing of the oil supplied to the auxiliary bearing 21 is prevented and an advantageous effect that a proper amount of oil can be continuously supplied to each sliding portion of the compressor is obtained.

Further, the insulating sleeve 28 includes the flange portion 28b located between the auxiliary bearing 21 and the housing cover 25 and extended in the outer diameter direction. Therefore, the insulating sleeve 28 can be prevented from coming off upward by the housing cover 25, and the insulating sleeve 28 can be prevented from coming off downward by the flange portion 28b. In addition, since the flange portion 28b is provided only on the upper end side, detachment of the insulating sleeve 28 relative to the inner race 21a of the auxiliary bearing 21 can be easily performed.

In the embodiment as described above, since the housing cover 25 for oil splashing prevention is used for coming-off prevention of the insulating sleeve 28, the assembly and coming-off prevention of the insulating sleeve 28 can be performed inexpensively and easily.

Moreover, the embodiment is configured such that the oil is supplied to the back side of the insulating sleeve 28 via the oil supply hole 6e formed in the crankshaft 6. Therefore, even when the insulating sleeve 28 slides with the crankshaft 6, wear of the insulating sleeve 28 can be prevented.

Embodiment 2

Next, Embodiment 2 of a refrigerant compressor of the invention will be described using FIG. 3 with reference to FIG. 1. FIG. 3 is a diagram showing the refrigerant compressor of Embodiment 2, which is an enlarged cross-sectional view of a main portion corresponding to the vicinity of the auxiliary bearing of the refrigerant compressor shown in FIG. 1. In Embodiment 2, portions different from Embodiment 1 described above will be mainly described, and a description of the same portions as Embodiment 1 described above is omitted.

Also in the embodiment, the oil passage 6d, the oil supply hole 6e, and the axial groove 6f are similar to those of Embodiment 1 described above. Embodiment 2 is different from Embodiment 1 described above in the configurations of the housing cover 25 and the insulating sleeve 28.

In the case of Embodiment 1 described above, the insulating sleeve 28 may move upward when the refrigerant compressor is operated for a long time. Although the coming-off of the insulating sleeve 28 can be prevented, there is a risk that a portion where the insulating sleeve 28 is not present may be generated between the inner race 21a of the ball bearing (antifriction bearing) configuring the auxiliary bearing 21 and the auxiliary shaft portion 6b of the crankshaft 6. Sufficient insulation may not be maintained if the insulating sleeve 28 is not present, because of which electrolytic corrosion may occur and reduce the reliability of the compressor.

Therefore, the embodiment employs a configuration in which the housing cover 25 includes the inner portion 25a where the flow passage 30 through which the oil flows is formed by providing a large clearance between the inner race 21a of the auxiliary bearing 21 and the housing cover 21, and the outer portion 25b where the clearance between the outer race 21b of the auxiliary bearing 21 and the housing cover 21 is made smaller than the clearance of the flow passage 30 in the inner portion 25a. Moreover, the clearance between the outer portion 25b and the outer race 21b of the auxiliary bearing 21 is configured to be larger than the thickness of the flange portion 28b of the insulating sleeve 28. On the other hand, the flange portion 28b of the insulating sleeve 28 is configured to be extended further in the outer diameter direction than the outer diameter of the inner race 21a of the auxiliary bearing 21 so that movement in the axial direction is restricted by the outer portion 25b of the housing cover 25.

The oil supplied through the oil supply hole 6 e is supplied via the flow passage 30 formed between the inner portion 25 a of the housing cover 25 and the inner race 21 a to the rolling elements 21 c of the antifriction bearing as the auxiliary bearing 21. In order to prevent the flange portion 28 b of the insulating sleeve 28 from inhibiting the flow of the oil, an opening 40 through which the oil can pass is formed in the flange portion 28 b. The opening can be formed by forming a hole or notch in the flange portion 28 b. Moreover, a configuration may be employed in which only several portions of the flange portion 28 b in the circumferential direction are extended further in the outer diameter direction than the outer diameter of the inner race of the auxiliary bearing 21 so as to overlap the outer portion 25 b of the housing cover 25 and thus the movement in the axial direction is restricted. Also in this configuration, the opening through which the oil can pass can be formed.

As has been described above, Embodiment 2 is configured such that at least a portion of the flange portion 28b of the insulating sleeve 28 is extended to the outer portion 25b of the housing cover 25 to overlap, in the axial direction, the outer portion 25b of the housing cover 25 where the clearance between the auxiliary bearing 21 and the outer portion 25b is small. Therefore, the movement of the insulating sleeve 28 can be limited to a small movement. Hence, according to Embodiment 2, an advantageous effect similar to that of Embodiment 1 described above is obtained, and in addition, the auxiliary bearing 21 and the crankshaft 6 can be always reliably insulated from each other by the insulating sleeve 28. Therefore, it is possible to more reliably suppress the occurrence of electrolytic corrosion due to the shaft current flowing through the auxiliary bearing. Moreover, in the embodiment, since the opening through which the oil flows is formed in the flange portion 28b, the oil can reliably flow to the rolling element 21c side of the auxiliary bearing 21 even when the flange portion 28b is extended to the outer portion 25b of the housing cover 25. Thus, it is possible to obtain a refrigerant compressor with high reliability.

As has been described above, each of the embodiments of the invention employs a configuration, in which a housing cover covering an opening of an auxiliary bearing housing for inserting an auxiliary bearing is included, an insulating sleeve is provided between a crankshaft and the auxiliary bearing, and the insulating sleeve includes a cylinder portion located between the crankshaft and the auxiliary bearing and a flange portion located between the auxiliary bearing and the housing cover and extended in the outer diameter direction. Hence, the occurrence of bearing electrolytic corrosion can be prevented by blocking the shaft current flowing from the crankshaft into the auxiliary bearing without using an antifriction bearing filled with a conductive grease and without using ceramics for the rolling element of the auxiliary bearing but with an inexpensive structure. Further, bearing damage due to an insufficient supply amount of oil can be suppressed because it is possible, by the housing cover, to prevent the oil supplied to the auxiliary bearing from splashing in the sealed container and being discharged to the outside of the compressor, and the coming-off of the insulating sleeve is prevented by the use of the housing cover. Therefore, it is possible to inexpensively obtain a refrigerant compressor with high reliability.

The invention is not limited to the embodiments described above, and includes various modified examples. For example, although the case where the refrigerant compressor is a vertical type scroll compressor has been described in the embodiments, the invention can be applied similarly to a horizontal type scroll compressor, a rotary compressor, or the like. Moreover, although the case where the auxiliary bearing is a ball bearing has been described, the invention can be applied similarly to the case where the auxiliary bearing is an antifriction bearing such as a roller bearing.

Further, the embodiments described above have been described in detail for clarity of description of the invention, and the invention is not necessarily limited to a refrigerant compressor including all of the configurations described.

REFERENCE SINGS LIST

1: scroll compressor, 2: compression mechanism portion, 3: drive portion,
4: sealed container, 4a: upper cap, 4b: lower cap, 4c: central cylindrical portion, 4d: leg portion,
5: oil reservoir,
6: crankshaft, 6c: eccentric pin portion, 6a: main shaft portion, 6b: auxiliary shaft portion,
6d: oil passage, 6e: oil supply hole, 6f: axial groove,
7: fixed scroll, 7a: base plate, 7b: scroll wrap,
7c: suction port, 7d: discharge port,
8: orbiting scroll, 8a: base plate, 8b: scroll wrap,
8c: orbiting boss portion, 8d: orbiting bearing,
9: frame, 9a: bearing support portion, 9b: compression mechanism support portion,
10: main bearing, 11: discharge pipe, 12: weld,
13, 23: volt, 14: compression chamber, 15: suction pipe,
16: discharge chamber, 17: electric motor chamber,
18: electric motor, 18a: stator, 18b: rotor, 18c: coil end,
19: Oldham coupling, 20: auxiliary frame,
21: auxiliary bearing, 21a: inner race, 21b: outer race, 21c: rolling element,
22: oil supply pump,
24: auxiliary bearing housing, 24a: opening,
25: housing cover, 25a: inner portion, 25b: outer portion,
26: magnet, 27: hermetic terminal, 28: insulating sleeve, 29: screw,
30: flow passage, 31: seal ring, 32: back pressure chamber,
33: oil drain pipe,
34: frame cover, 35: balance weight

The invention claimed is:

1. A refrigerant compressor comprising:
a compression mechanism portion that compresses a refrigerant;

a drive portion for driving the compression mechanism portion;

a crankshaft that is rotationally driven by the drive portion;

a main bearing that rotationally supports a main shaft portion of the crankshaft on the compression mechanism portion side of the drive portion;

an auxiliary bearing that rotationally supports an auxiliary shaft portion of the crankshaft on a side of the drive portion opposite to the compression mechanism portion; and a sealed container that accommodates therein the compression mechanism portion, the drive portion, the crankshaft, the main bearing, and the auxiliary bearing, wherein the auxiliary bearing is configured of an antifriction bearing including an inner race, an outer race, and a rolling element, and is provided in an auxiliary bearing housing attached to the sealed container, wherein the auxiliary bearing housing includes an opening for inserting the auxiliary bearing on the drive portion side, and includes a housing cover covering the opening, wherein an insulating sleeve configured of an insulating material is provided between the crankshaft and the auxiliary bearing, wherein the insulating sleeve includes a cylinder portion located between the crankshaft and the auxiliary bearing, and a flange portion located between the auxiliary bearing and the housing cover and extended in an outer diameter direction, wherein the housing cover is for preventing an oil supplied to the auxiliary bearing from splashing to the drive portion side, and is configured so as to cover a portion from an outer circumferential side of the crankshaft to a portion of the outer race of the auxiliary bearing, wherein the antifriction bearing configuring the auxiliary bearing is a ball bearing, and wherein the flange portion of the insulating sleeve is extended further in an outer diameter direction than an inner diameter of the inner race of the auxiliary bearing.

2. The refrigerant compressor according to claim 1, wherein the housing cover includes an inner portion where a flow passage through which an oil flows is formed by providing a large clearance between the inner race of the auxiliary bearing and the housing cover, and an outer portion where a clearance between the outer race of the auxiliary bearing and the housing cover is made smaller than the clearance of the flow passage in the inner portion.

3. The refrigerant compressor according to claim 2, wherein the flange portion of the insulating sleeve is configured to be extended further in an outer diameter direction than an outer diameter of the inner race of the ball bearing so that movement in an axial direction is restricted by the outer portion of the housing cover.

4. The refrigerant compressor according to claim 3, wherein an opening for allowing an oil to flow to the rolling element side of the auxiliary bearing is formed in the flange portion of the insulating sleeve.

5. The refrigerant compressor according to claim 1, wherein the refrigerant compressor is a vertical type scroll compressor, the scroll compressor includes an oil reservoir provided in a lower portion of the interior of the sealed container, an oil passage formed so as to penetrate the crankshaft in an axial direction, an oil supply pump provided on a lower end portion side of the crankshaft for supplying an oil in the oil reservoir to the oil passage, and an oil supply hole formed in the crankshaft in a radial direction for supplying a part of the oil flowing through the oil passage to the auxiliary bearing, and the scroll compressor is configured such that after the oil is introduced between the auxiliary bearing and the housing cover through the oil supply hole, the oil is supplied to the auxiliary bearing.

* * * * *